Nov. 30, 1937.  C. N. HICKMAN  2,100,317
BOW
Filed June 22, 1935  4 Sheets-Sheet 1

INVENTOR
Clarence N. Hickman

Nov. 30, 1937.   C. N. HICKMAN   2,100,317
BOW
Filed June 22, 1935   4 Sheets-Sheet 2

INVENTOR
Clarence N. Hickman

Nov. 30, 1937. C. N. HICKMAN 2,100,317
BOW
Filed June 22, 1935 4 Sheets-Sheet 3

INVENTOR
Clarence N. Hickman

Nov. 30, 1937.  C. N. HICKMAN  2,100,317
BOW
Filed June 22, 1935   4 Sheets-Sheet 4

INVENTOR
Clarence N. Hickman

Patented Nov. 30, 1937

2,100,317

UNITED STATES PATENT OFFICE 2,100,317

BOW

Clarence N. Hickman, Jackson Heights, N. Y.

Application June 22, 1935, Serial No. 27,890

12 Claims. (Cl. 124—23)

This invention relates to bows and the object of the invention is, in general, to increase their power to cast an arrow.

Most of the bows now in use when unbraced are approximately straight; when braced they are deflected forwardly (toward the user) under stress and when fully drawn this deflection is increased to such an extent that the limbs are subjected to very high fiber stresses. Such bows with use often take a permanent set the effect of which is to decrease the cast of the bow and to offset this undesirable effect the limbs of the unbraced bow are sometimes reflexed backwardly (away from the user). Bows of this latter type in the braced and drawn positions are similar in appearance to those of the first type but they have greater casting power and also correspondingly higher fiber stresses in their limbs. Some improvement over the straight bow has also been obtained by using bow limbs having rigid tip portions curved back (away from the user). When this feature is combined with highly reflexed limbs, as in the Turkish bow, much greater casting power is obtained for the same holding force. The fiber stresses in such a bow are also very high, however, and this requires the use of a composite construction of special materials with high elastic limits. In still another well-known construction the limbs are straight but set back at an angle with the handle. This gives greater casting power than the simple straight bow but also increases the fiber stresses. In each of the above constructions the limbs of the bow are under considerable fiber stress when the bow is in the braced position and, since this potential energy is put into the bow before the draw begins, it is not available to do work on the arrow.

In accordance with the present invention, the limbs or bending portions of the bow are preferably highly reflexed and form a forward instead of a backward angle with the handle or rigid portion of the bow. With this construction great casting power is obtained without stress or with very low stresses in the limbs when in the braced position. When the bow is fully drawn the limbs may be approximately straight and at right angles to the string so that very short limbs may be used for relatively long arrows. In all prior bows the limbs are bent forward toward each other in the early part of the draw and the string soon becomes radial to the limbs which is ordinarily considered about the limiting position to which the bow should be drawn. In the bow of this invention, although the limbs are set forward with respect to the handle, they are so highly reflexed that the string in the braced position lies along the convex sides of the limbs. With such a bow a much longer draw is required to bring the string perpendicular to the limbs with the result that in the drawn position a much greater effective potential energy is stored in the bow without exceeding the fiber stress commonly used in other types.

Another feature of the invention is a bow in which the bracing height is varied according to the weight of the arrow to be used to give more nearly constant acceleration.

Further important features of the invention are a composite bow limb and methods of making this limb. If two or more suitable thin strips clamped together at one end are deflected and secured together while in the deflected position, the composite strip, when the deflecting force is removed, will assume an equilibrium position in which the deflection is usually somewhat less than the original deflection. This composite spring member when used as a bow limb and deflected to the straight position may have more than twice the casting power of a single piece limb of the same dimensions working at the same maximum fiber stress.

These and other features of the invention will be more clearly understood from the following detail description and the accompanying drawings in which Fig. 1 is a front view of a bow according to this invention.

Figure 7:
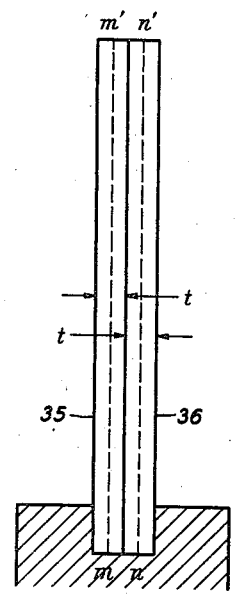
Figure 8:
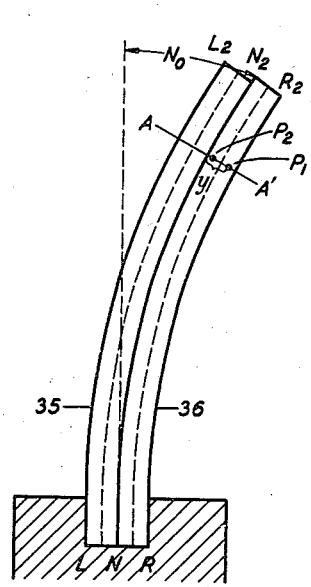
Figure 9:
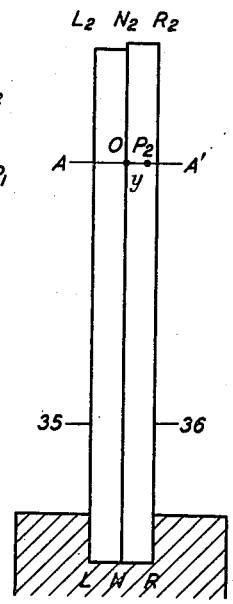

Figs. 7, 8, and 9 show the preferred bow limb and a method of making it according to the invention.

Figure 10:
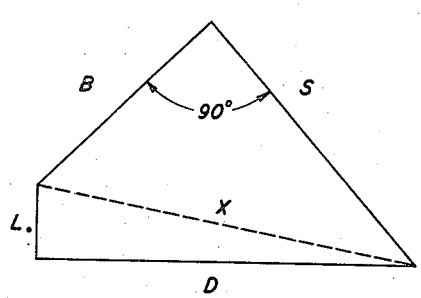
Figure 11:
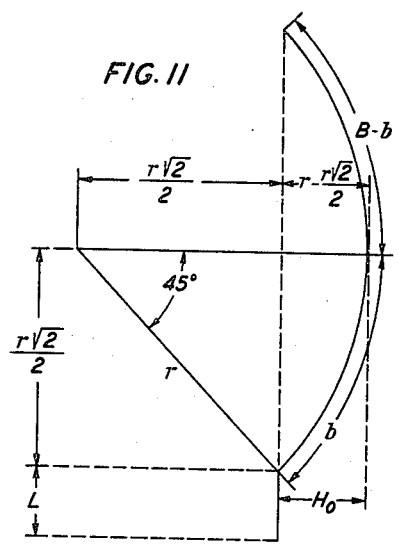

Figs. 10 and 11 are diagrams illustrating the method of calculating the draw of the new bow.

Figure 12:
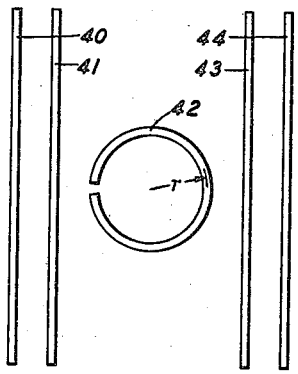
Figure 13:
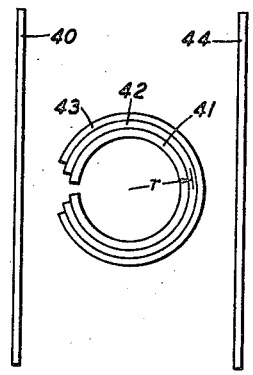
Figure 14:
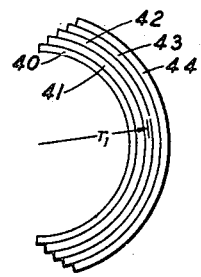
Figure 15:
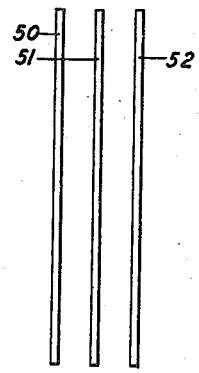
Figure 16:
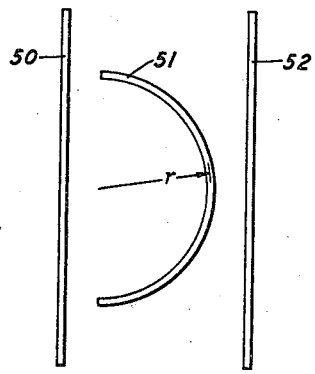
Figure 17:
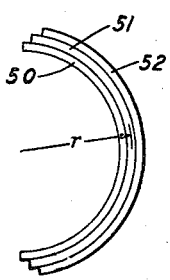
Figure 18:
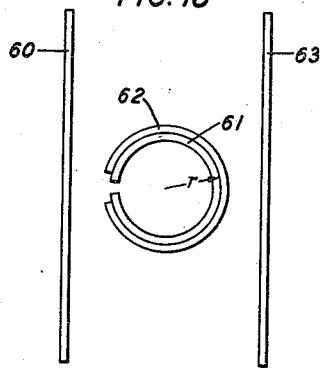
Figure 19:
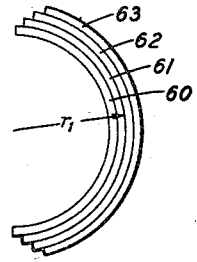

Figs. 12, 13, and 14 show the method of assembling a laminated bow limb according to one feature of the invention;

Figs. 15, 16, and 17 show the method of assembling a bow limb having a preformed core; and Figs. 18 and 19 show the method of assembling a bow limb having a core formed from two laminations.

In Figs. 1 to 4 the bow limbs 12 and 13 are laminated and set in the handle 14 at a forward angle $\alpha$ of about 45 degrees. In this bow the limbs are so highly reflexed that the tips of the limbs lie back of the handle when the bow is unbraced.

It should be understood, however, that the invention is not limited to this particular embodiment. While it may be shown that for maximum draw the forward angle of the limb should be about 45 degrees, it may be desirable to use smaller or larger angles for other kinds of bows. Even very small angles are preferable to the conventional straight construction but in most cases the angle will be from 30 degrees to 45 degrees. The angle at which the limbs are set forward, the extent to which they are reflexed and the height to which the bow is braced in a particular case will depend on various factors such as the material of which the limbs are made, the length of the handle and the type of use for which the bow is designed.

Figure 1:
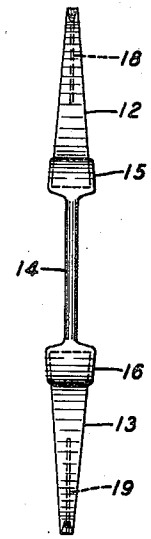
Figure 2:
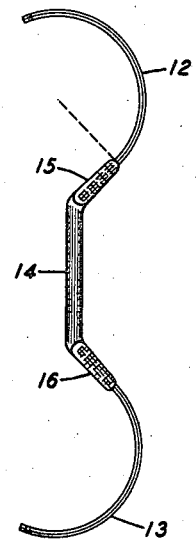
Figs. 2 and 3 show the bow in the unbraced and braced positions respectively.
Figure 3:
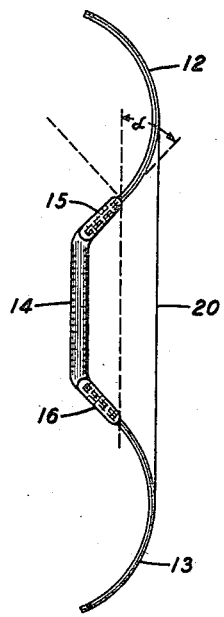

While the limbs are preferably laminated for other reasons to be explained, the advantages of the forward angle of the limbs are realized equally well in bows with limbs made from a single piece or in bows made entirey from a single piece. The limbs, however, will ordinarily be made up separately and set in a suitable handle with end pieces 15 and 16 projecting forwardly at the desired angle and having suitable sockets for fixing the limbs in place. Since the limbs are reflexed the string 20 in the braced position will lie along the convex side of the limbs as shown in Fig. 3. In order to keep the bow stable and to obtain sufficient drawing force, the limbs are appreciably wider at the handle than in bows of other types. If desired, grooves 18 and 19 may be provided to prevent the string 20 from slipping off the limbs.

Figure 4:
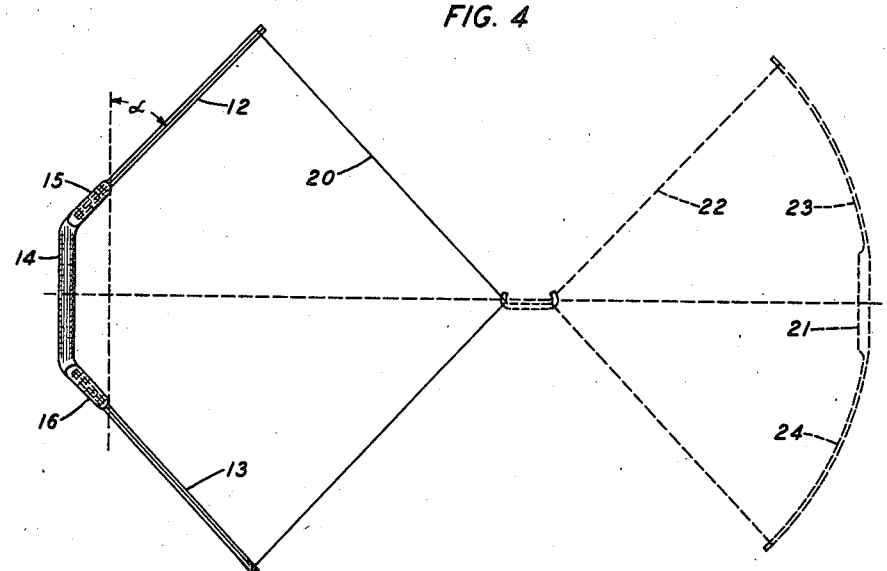
Fig. 4 shows the new bow held in the fully drawn position by a common bow of the same size to illustrate the increased length of draw obtainable with the new bow.

In Fig. 4 the bow has been drawn to the position of maximum draw, namely the position in which the limbs are straight and the string is at right angles to the limbs. It is held in this position by the holding force of a common bow 21 of the same dimensions and it will be seen that although the string 22 is radial to the limbs 23 and 24 the draw of the bow 21 is much less than that of the new bow so that a bow according to this invention with short limbs may use relatively long arrows. The extent of this advantage is shown more clearly by a specific example. For straight or conventional reflexed bows the length of draw which brings the string to the radial position is given quite accurately by the formula $$D = .98B - \frac{2H^2}{6B} + \frac{L}{2} \qquad (1)$$

in which
D is the draw
B is the length of each bow limb
L is one-half the length of the handle and
H is the bracing height.
If $B=16$ inches, $L=4$ inches and $H=4$ inches
Then $D=17.3$ inches.

This formula is quite accurate since it takes into consideration the bracing height, the length of the handle and the manner in which the bow bends. The last two terms, however, are relatively small and to some extent offset each other so that a very good approximation is given by $$D = .98B \qquad (2)$$

Or as commonly stated in archery, the bow should be about twice as long as the arrow to permit the bow to be drawn until the string is radial to the limbs.

The draw of the bow of this invention may be calculated as follows:

In Figs. 10 and 11 which are schematics of one-half the bow in the drawn and braced positions, respectively, S is one-half the length of the string, $r$ is the radius of curvature of the limb and B, L and D have the same significance as above. In Fig. 10

$$X^2 = B^2 + S^2 \qquad (3)$$

$$D^2 = X^2 - L^2 = B^2 + S^2 - L^2 \qquad (4)$$

But in Fig. 11

$$S = B - b + \frac{r\sqrt{2}}{2} + L = B - \frac{\pi r}{4} + \frac{r\sqrt{2}}{2} + L =$$

$$B - \frac{r}{2}\left(\frac{\pi}{2} - \sqrt{2}\right) + L = B - .0783r + L \qquad (5)$$

But $r = 3.41 H_o$ as indicated in Fig. 11 so that $$S = B - .267 H_o + L \qquad (6)$$

Substituting this value of S in (4) above $$D^2 = B^2 + (B + L - .267 H_o)^2 - L^2 =$$
$$2B^2 + 2BL - .534 B H_o - .534 H_o L \qquad (7)$$

$$D = B\sqrt{2 + \left(\frac{2L - .534 H_o}{B}\right) - \left(\frac{.534 H_o L}{B^2}\right)} \qquad (8)$$

But the last term in (8) is relatively very small so that very approximately $$D = B\sqrt{2 + \frac{2L - .534 H_o}{B}} \qquad (9)$$

With B, L and H the same as in the other bow, then the draw D, for the new bow is 24.7 inches which is an increase of 43 per cent over the common bow.

Figure 5:
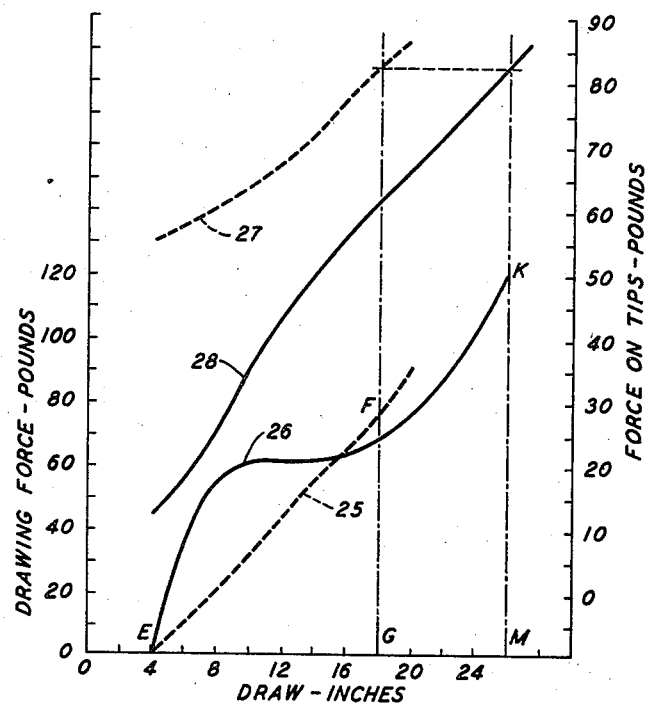
Fig. 5 shows the force-draw and bow limb stress curves for the new bow and for a conventionally reflexed bow having limbs of the same dimensions as shown in Fig. 4.

Since the energy which may be imparted to an arrow by any bow depends on the area under the force-draw curve, the increased casting power of the new bow is clearly seen from a comparison of its force-draw curve with that of a conventional reflexed bow of the same dimensions. In Fig. 5 curve 25 represents the force-draw curve of a conventional reflexed bow with constants as given above in connection with Equation (1) and curve 26 the force-draw curve of a bow according to this invention having the same constants. The force on the tips of the bow limbs for any point in the draw is given for each bow by curves 27 and 28, respectively.

For purposes of direct comparison, the reflex of the limbs of the conventional bow in this case is made such that when the string is radial, the limbs are subjected to the same stress as the limbs of the new bow when the string is at right angles. The initial limb stress of this conventional bow is 55 pounds and increases to 83 pounds at the radial position but the initial limb stress of the corresponding new bow is only 12.5 pounds and increases during the draw to 83 pounds at the right angle position. The effective energy stored in the first bow is then proportional to the area under the curve 25 to the left of the line FG and the effective energy stored in the new bow is proportional to the area under curve 26 to the left of the line KM. From this it is obvious that for any given limb stress the new bow has a much greater casting power than the conventional reflexed bow and for the case shown the cast of the new bow is about two and one-half times the cast of a conventional reflexed bow of the same dimensions.

Figure 6:
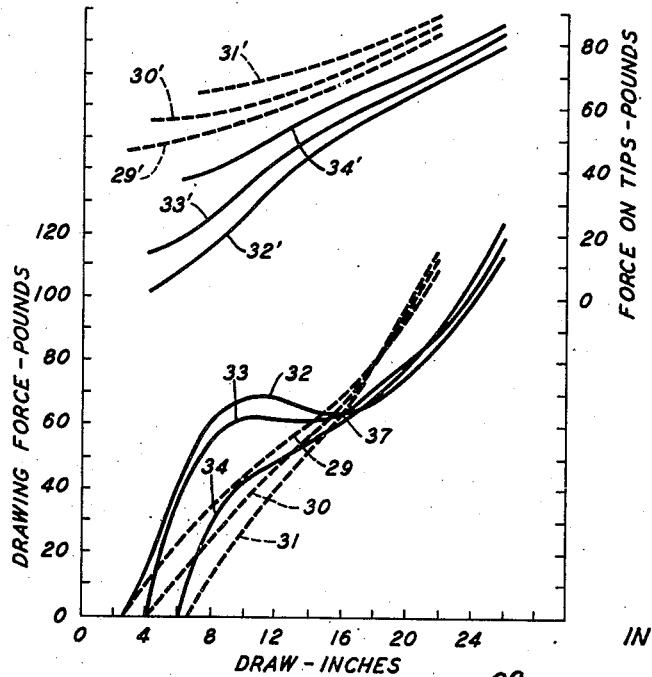
Fig. 6 shows the effect on the force-draw curves of the bows of Fig. 5 of varying the bracing height.

Fig. 6 shows how the shape of the force-draw curve of the new bow may be varied by varying the bracing height. Curves 29, 30 and 31 are the force-draw curves of the above conventional reflexed bow for bracing heights of 3, 4 and 6.3 inches, respectively, and 32, 33 and 34 are the corresponding curves for the new bow with the same bracing heights. Curves 29', 30' and 31' show the forces on the tips of the limbs for the conventional bow corresponding to the force-draw curves 29, 30 and 31 and curves 32', 33' and 34' show the forces on the tips of the limbs of the new bow corresponding to the force-draw curves 32, 33 and 34.

It will be observed that the bracing height has but little effect on the force at full draw for either bow and that it has only a moderate effect on the curves for the conventional bow in the early part of the draw. In the case of the new bow, however, the lower bracing heights materially increase the amount of work done in the early stages of the draw and hence the energy imparted to the arrow as the bow again approaches the braced position after the arrow is released. This characteristic of the bow makes it possible to adapt it to arrows of different weights to obtain more nearly constant acceleration than is possible with other bows. In general, when an arrow is released and the bow begins to return to the braced position both the arrow and the bow limbs are accelerated by the potential energy stored in the bow. The division of this energy between the limbs and the arrow at this time will, of course, depend upon their relative masses. As the bow approaches the braced position the kinetic energy of the bow limbs is transferred through the string to the arrow.

For very heavy arrows the kinetic energy of the limbs is relatively small as compared with the potential energy stored in them by drawing the bow; but for very light arrows and a massive bow this kinetic energy will produce a sudden increase in the acceleration of the arrow just before it leaves the string. Since the arrow must be strong enough to withstand the stresses to which it is subjected at the time of maximum acceleration, very light arrows cannot be used with very heavy bows of prior designs.

With the bow of this invention, however, the bracing height may be adjusted for each weight of arrow to be used so as to keep the total force on the arrow nearer to the maximum permissible value over a large part of the travel of the string. For very heavy arrows, since the kinetic energy of the limbs is relatively small, the bow is preferably braced to the height required to give a force-draw curve similar to the curve 33 of Fig. 6 which is relatively flat near the braced position. For very light arrows the bracing height is increased to produce a force-draw curve such as 34. In this case the kinetic energy of the limbs will tend to accelerate the arrow as the string approaches the braced position but at this time the force on the arrow due to the potential energy of the limbs is decreasing rapidly, as shown by the droop in curve 34, so that the total force on the arrow remains more nearly constant.

When the limbs of this bow are highly reflexed they must be laminated as in other highly reflexed bows. It will be seen from Fig. 3 that during the draw the laminations will tend to pull apart and hence, external wrappings—or their equivalent—may have to be used to hold the back and belly together. While a bow of much greater casting power than prior bows may be made with reflexed limbs set forward in the handle as described above, the casting power may be still further increased by using a laminated limb of the type shown in Figs. 7 to 9.

If two thin strips 35 and 36 of wood, for example, are clamped at one end as shown in the drawings and the free ends are deflected a distance $N_0$ as shown in Fig. 8, the fiber stresses in the two strips will be approximately equal. The deflection in either strip at any point $P_1$ on the section A—A' is proportional to the deflection $N_0$, and to the distance from the neutral plane of the strip. We may therefore write $$N_1 = K_1 N_o \left( y - \frac{t}{2} \right) \qquad (10)$$

where $N_1$ is the deflection at $P_1$, $K_1$ is a constant of proportionality, $y$ is the distance of $P_1$ from the neutral plane of the strip 36 and $t$ is the thickness of the strip.

If the strips 35 and 36 are glued or otherwise secured together while deflected as in Fig. 8 and the deflection $N_0$ is decreased by an amount $N$, the deflection at $P_1$ is then $$N_1' = K_1' N_o \left( y - \frac{t}{2} \right) - Ny \qquad (11)$$

The force at $P_1$ is proportional to the deflection or $$F = K_2 \left[ N_o \left( y - \frac{t}{2} \right) - Ny \right] \qquad (12)$$

The moment of this force about the neutral axis $N$—$N_2$ of the composite strip is then $$I = K_2 \left( N_o \left( y - \frac{t}{2} \right) - Ny \right) y \qquad (13)$$

The total moment of the forces for the right half section of the strip 36 at $P_1$ is then $$I_1 = \int_{\frac{t}{2}}^{t} K_2 \left( N_o \left( y - \frac{t}{2} \right) - Ny \right) y \, dy =$$

$$\frac{K_2 t^3}{48} (5N_o - 14N) \qquad (14)$$

Similarly it may be shown that the total moment for the left half section including point $P_2$ is $$I_2 = \frac{K_2 t^3}{48} (N_o - 2N) \qquad (15)$$

Adding these moments we get $$I_3 = I_1 + I_2 = \frac{K_2 t^3}{48} (4N_o - 16N) \qquad (16)$$

The moments of force for the strip 35 along section A—A' is very approximately the same as for the strip 36 so that the total moment for the entire section is $$I_4 = \frac{K_2 t^3}{24} (4N_o - 16N) \qquad (17)$$

When the composite strip is removed from the gluing form, $N$, the change in the deflection $N_0$, will of course be such that the total moment is zero so that $$N = \frac{N_o}{4} \qquad (18)$$

In other words, the composite strip when released takes a position in which the deflection becomes $$\frac{3}{4} N_o$$

In order to straighten this strip it must be deflected in the opposite direction a distance of $$\frac{3}{4} N_o$$

as shown in Fig. 9. The neutral plane will then be along the line N—$N_2$ and all the fiber elements to the left of N—N₂ will be under substantially equal compression and all the fiber elements to the right will be under substantially equal tension. Hence the stresses will be independent of the distance of the fibers from the neutral plane and will be equal in value to the maximum fiber stresses along the surfaces of the strips when they were deflected a distance $N_o$, namely $$K_2 N_o \frac{t}{2}$$

The moment of force about the point 0 (Fig. 9) produced by the force at $P_2$ is $$Fy = \frac{K_2 N_o t y}{2} \qquad (19)$$

The total moment of force of all points in the plane A—A' (Fig. 9) is therefore $$I_5 = K_2 N_o \int_{y=o}^{y=t} t y\, dy = K_2 N_o \frac{t^3}{2} \qquad (20)$$

The increased moment obtained in this manner for a given fiber stress will be apparent by comparing this composite strip with a single piece at the same fiber stress.

If a single piece of wood having a thickness $2t$ is deflected a distance $$\frac{N_o}{2}$$

the maximum fiber stress will be the same as for the two unglued strips 35 and 36 when they were deflected a distance $N_o$. Assume such a piece formed by steaming or otherwise in a curved shape corresponding to a deflection $$\frac{N_o}{2}$$

When this piece is straightened the total moment at any given section by a calculation similar to that above is shown to be $$I_6 = \int_{y=o}^{y=t} K_2 N_o y^2 dy = K_2 N_o \frac{t^3}{3} \qquad (21)$$

From Equations (20) and (21) it is apparent that the composite strip gives a moment of force 50 per cent greater than the single piece for the same fiber stress. The composite strip must also be deflected 50 per cent more to produce the same fiber stress so that it is capable of performing 2¼ times the work of the single piece strip.

Such a composite strip is very useful as a bow limb since it makes possible bows of great casting power which are relatively light in drawing weight. The general principle described above is, of course, applicable to flat spring members of any material. They may be formed so as to be deflected from a curved to a straight position as already explained or they may be so formed that they are straight in the equilibrium position and are deflected to a curved position. When such members are made of materials, such as wood, the stresses in the equilibrium position will, of course, eventually disappear causing a change of shape and a decrease in the work they are capable of performing with a given fiber stress. If strips of certain other materials, such as steel, are used there is no appreciable fatigue and the advantages of this construction are permanent.

For bows which are designed to be drawn until the limbs are straight the two lamination limb structure described above will ordinarily be used. In some cases, however, it may be desirable to use longer limbs and draw the bow only until the holding force has reached the point 37 on the force-draw curve 33 of Fig. 6. At this position the bow has a comparatively high casting power with relatively low holding force, as can be readily seen from the curve, and due to the longer limb length the angle which the string makes with the arrow is larger so that the bow is well adapted to target shooting.

If the limbs of this bow were made of two laminations by the above method they would not be at maximum stress at the full draw position (at point 37). By using three or more strips, however, it is possible to choose the strip thickness so that the limbs will be stressed to the maximum safe values when the bow is drawn only to the point 37. By calculations similar to those given for the two strip limb, it may be shown that if three similar strips are deflected the maximum safe distance $N_o$ and secured together in this position, the composite structure, when released, will spring back a distance of $$N = \frac{N_o}{9}$$

When used as a bow limb it may be deflected from this position a distance of $$N_o\left(\frac{2}{3} - \frac{1}{9}\right) = \frac{5 N_o}{9}$$

without exceeding the fiber stress present during the original deflection.

Since the fiber stress of the center strip decreases as the bow is drawn and is in the reverse direction from the stresses in the outer strips, the center strip adds nothing directly to the cast of the bow. If, however, the center strip is first steamed to the curved form (in which the deflection is $N_o$) when the limb is being made, the limb when released from the gluing form will spring back only a distance $$N = \frac{2 N_o}{27}$$

which is $$\frac{N_o}{27}$$

less than in the case where the center strip is not preformed. Hence, by preforming the center strip it can be made to contribute to the cast of the bow. The method of making a limb of this type is illustrated in Figs. 15 to 17. Starting with three similar laminations 50, 51, and 52, lamination 51 is steamed to the shape shown in Fig. 16. Laminations 50 and 52 are then deflected to the curved shape of lamination 51 and secured to it to form the completed limb shown in Fig. 17.

A still further improvement may be obtained in the following manner: Two strips each of one-half the thickness of the outer strips are first bent and secured together on a form having one-half the radius of curvature of the form to be used in making the three strip structure. This composite center strip is then glued to the outer strips on the larger form. When released the limb will spring back a distance of $$N = \frac{N_o}{56}$$

and may be deflected a distance of $$N_o\left(\frac{2}{3} - \frac{1}{56}\right)$$

before the elastic limit is reached. If on the other hand, the two strips used for the center of the limb are each equal in thickness to the outer strips and the procedure used is otherwise the same, the limb will not spring back when released but will take a further deflection of $$N = \frac{N_o}{32}$$

This limb may be deflected a distance of $$N_o\left(\frac{3}{4}+\frac{1}{32}\right)$$

before the elastic limit is reached.

For bow limbs consisting of a considerable number of laminations, the method of assembly should be substantially the reverse of that used by the Turks. It was common practice for Turkish bow makers to build up a laminated limb structure by applying thin layers of sinew and glue to a core of maple. They applied the first layer of sinew to an approximately straight core and progressively increased its deflection with each successive layer so that the completed bow was highly reflexed. It will be readily seen that when a bow having limbs made in this manner is drawn, the fibers of the external layers are subjected to much higher stresses than those of the layers near the core.

According to this invention the reverse of the procedure used by the Turks is followed. The first layer is applied with the core highly reflexed to a radius of curvature much smaller than that desired for the completed limb. The curvature of the member is then decreased somewhat before the next layer is applied and this process is repeated until the desired number of layers have been applied. This procedure is illustrated in Figs. 12, 13 and 14. Beginning with five similar laminations 40 to 44 the core lamination 42 is deflected as shown in Fig. 12. In this position laminations 41 and 43 are secured to the core as shown in Fig. 13 and this composite member is then opened out to the position shown in Fig. 14 and the outer laminations 40 and 44 are secured in place to form the complete limb.

When the two lamination core described above is used two thin laminations 61, 62 are bent to the form shown in Fig. 18 and secured together. This core is then partially straightened to the position shown in Fig. 19 and the laminations 60 and 63 are applied in this position to complete the limb. In each case the initial curvature of the core and the change in curvature between the application of successive layers are made such that in the completed limb after being bent to the desired full draw position, the fiber stresses in all the layers are substantially equal, as in the limb formed from only two laminations, although the layers are at various distances from the center of the limb.

Thus it will be seen that by proper choice of the number of strips to be used and the thickness of each strip the limb may be designed to produce the best result for the type of service for which a particular bow is designed.

When it is said of these laminated limb structures that the fiber stresses are equal throughout the limb section at full draw position it will be understood that this condition can never be exactly obtained in practice. The variation in stress across a single lamination for a two lamination structure (or one with an infinite number of laminations) is, however, negligible as compared with the total stress but the approximation is not so close for structures with an odd number of laminations.

The relative cost of making a bow in accordance with the several methods described will often be an important factor in the choice of the construction to be used. By resorting to a slightly more expensive procedure, uniform fiber stress throughout a cross-section of the limb for any deflection at full draw can always be obtained according to the invention with the two strip structure. For example, in the case discussed above where longer limbs are used to obtain the desired cast without pulling the limbs to the straight position, the two strips may be first steamed or otherwise formed to the shape desired at full draw. The strips are then further deflected the desired amount and glued in this position. A bow having limbs of this type may then be drawn until the limbs have the curvature of the original steamed strips and the stresses will then be uniform throughout the section.

It should also be noted that the general feature of the several limb constructions described, namely a laminated structure built up in such a way as to have equal fiber stresses throughout its cross-section at full draw position, is not limited to the constructions described. For straight limb bows the strips would first be formed to the radius of curvature which the limbs are to have at full draw. Before gluing they would be bent back beyond the straight position far enough so that the glued limb would assume the straight position when released from the form. It will also be understood that this principle is not limited to limbs which are to be set forward according to the preferred construction and that reflexed limbs for ordinary bows may be made in accordance with the principles of this invention.

It should be particularly noted that the invention is not limited to bows with demountable limbs. The term "handle portion" as used above refers to a comparatively rigid section between the limbs but the limbs and handle may be made from a single continuous piece or a single unitary laminated structure formed to the desired shape and made rigid at the handle portion by the addition of a suitable stiffening member.

In making bow limbs it is common practice to form the limb to size by splitting so that the cleavage follows the grain of the material and results in a limb of maximum strength for a given limb thickness. Some of the best bow materials, including yew-wood and horn, usually have irregular grain so that laminations of these materials cannot be readily secured together in close relation without inducing undesirable stresses in them.

When such materials are to be used it may therefore sometimes be difficult to take full advantage of the novel methods of constructing laminated limbs described above. In such cases the belly of the bow may be made of one of these irregular grain materials and the back of a plurality of layers of some other material which will more readily conform to the irregular contour of the belly material. For example, if horn is used for the belly and silk ribbon or fibers for the back, the belly material may first be deflected to the maximum safe curvature, and a thin layer of the backing material secured to its concave side preferably under tension. The curvature of the member is then somewhat reduced and a second layer applied to the first under slightly less tension and this procedure is repeated until the desired thickness of backing has been obtained. As in the case of the limb composed entirely of many similar laminations, this limb may be built up so that all its fibers on the tension side will be equally stressed in the full draw position.

While the invention has been illustrated by showing a bow in which the limbs are made up separately and subsequently fitted into a handle having forwardly inclined rigid extension pieces it is equally applicable, as already stated, to bows in which the limbs are integral with the handle. In order to realize the advantages of the forward angle feature it is merely necessary that the portion of the reflexed limbs adjacent the handle be set forward at an abrupt angle to the handle portion instead of being in line with the handle as in other bows. This can be done with a unitary structure by steaming and bending the parts to their proper relative positions. Hence, while it may be more convenient to form the limbs separately the invention is not intended to be limited to a bow of this particular type and it will be understood that the several features described may be modified and combined in various ways within the scope of the following claims.

What is claimed is:

1. A bow having a handle portion, reflexed limbs forming an abrupt forward angle with the handle portion and a string connecting the tips of the limbs and resting on the belly of the active bending portions of the limbs.

2. A bow according to claim 1 in which the active bending portions of the limbs have grooves to keep the string in position.

3. The method of making a laminated structure which comprises deflecting one of the laminations, securing a lamination to each side of the lamination in the deflected position to form a composite member, reducing the deflection of the member and securing other laminations thereto in the position of reduced deflection.

4. The method of making a laminated structure which comprises preforming a lamination to a curved shape in which it is substantially unstressed, deflecting a straight lamination to the shape of the curved lamination on each side thereof and securing said laminations together in the curved position.

5. The method of making a laminated structure which comprises forming a core member by bending two strips to a small radius of curvature, securing the strips together in the bent position, partially straightening the core member and securing outer laminations thereto in the partially straightened position.

6. A bow comprising a handle and limbs, said limbs having active bending portions which are reflexed in the braced position and end portions adjacent the handle forming an abrupt forward angle with the handle.

7. A bow according to claim 6 in which the forward angle is at least 30 degrees.

8. A bow comprising a rigid handle having end portions disposed at a forward angle and reflexed limbs extending from the end portions of the handle.

9. A bow having a rigid handle and limbs secured to the handle at an abrupt forward angle, said limbs being reflexed in the braced position of the bow and each comprising at least two laminations so stressed that the stresses in all the elements of a section of the limb become more nearly equal as the bow is drawn.

10. The steps in the method of making a laminated limb for bows which comprises deflecting two laminations, to the position of substantially maximum permissible fiber stress, in the direction opposite to that in which the limb is to be drawn and securing the laminations together in that position.

11. The step in the method of making a laminated limb for bows which comprises preforming each lamination separately in the same direction to the curvature it will have in the full draw position of the completed limb.

12. The steps in the method of making a laminated limb for bows which comprises preforming two laminations in the same direction to the shape they will have in the full draw position of the completed limb, deflecting the preformed laminations in the opposite direction to the position of substantially maximum permissible fiber stress and securing the laminations together in the deflected position.

CLARENCE N. HICKMAN.